June 26, 1951
J. W. F. HOLL
2,558,087
FLUID SEAL FOR ROTARY FLUID VALVES
Original Filed Feb. 28, 1944
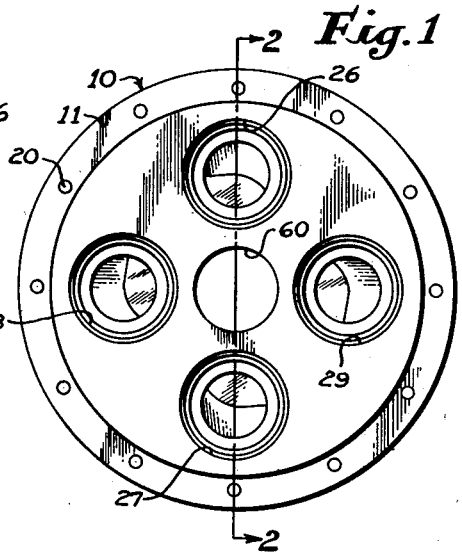
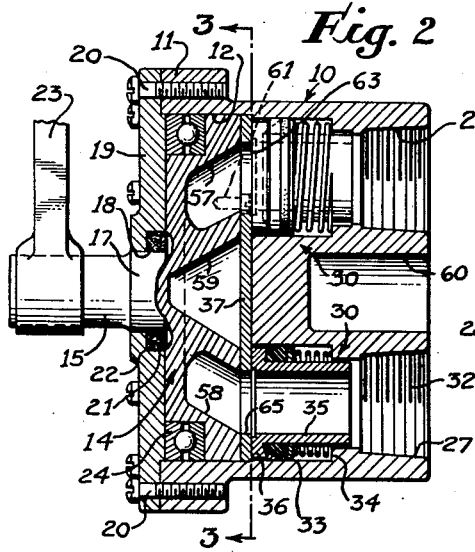
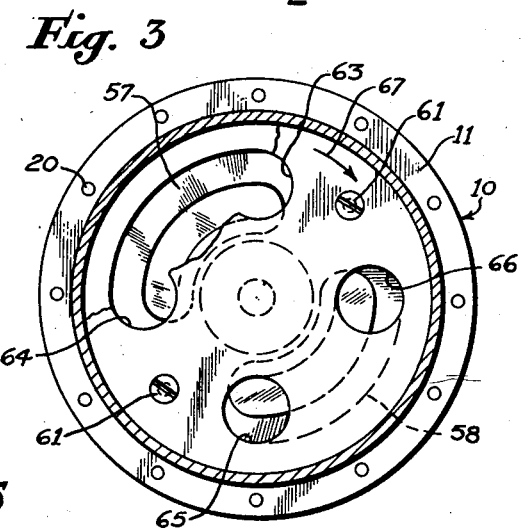
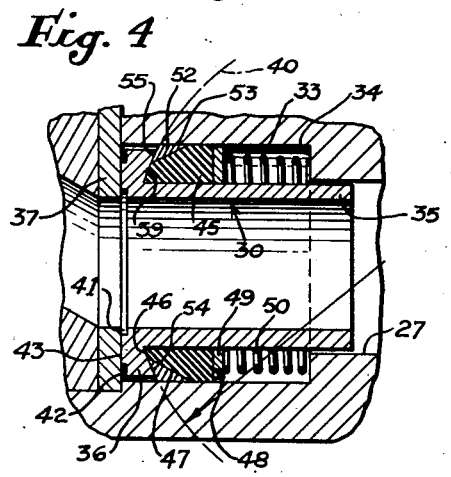
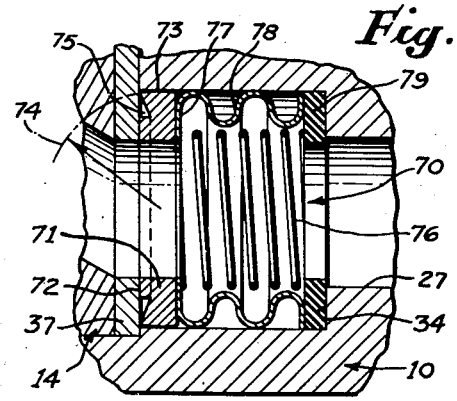
INVENTOR
JAMES W. F. HOLL
By HARRIS, KIECH, FOSTER, & HARRIS
FOR THE FIRM
ATTORNEYS Patented June 26, 1951

2,558,087

UNITED STATES PATENT OFFICE 2,558,087

FLUID SEAL FOR ROTARY FLUID VALVES

James W. F. Holl, Los Angeles, Calif.

Original application February 28, 1944, Serial No. 524,216. Divided and this application December 3, 1945, Serial No. 632,388

6 Claims. (Cl. 251—87)

My invention relates to the fluid valve art and, more particularly, to means for forming a fluid seal between a cylindrical bore of a pressure fluid passage and a valve plate partially closing one end of said passage, this application being a division of my application entitled "Rotary Fluid Valve," filed February 28, 1944, Serial No. 524,216, which has matured into Patent No. 2,519,574, on August 22, 1950.

The invention has particular utility when used in high pressure four-way valves and, consequently, will be described in connection with such use, but it is to be understood that the fluid seal may also be utilized profitably in various types of low pressure valves, such as, for example, fuel valves, and that features of the invention may be successfully utilized in valves other than four-way valves. The specific embodiments shown and described herein are not, therefore, to be construed as limiting, and I desire to cover all constructions within the spirit of my invention.

Rotary valves of the porting plate type are generally old and well known in the art, having been used for many years, for example, to supply and control a flow of fuel gas to the conventional type of home gas water heater. Such valves are generally provided with a plurality of gas ports communicating with a rotatable control plate which is also suitably ported to direct the flow of gas between the gas ports as desired in response to rotation of the plate. Such prior valves have been developed to operate at the relatively low gas pressures normally provided by gas distribution systems, and are wholly unsuited for and incapable of use with high pressure fluid systems, such as, for example, those employed in aircraft hydraulic systems in which fluid operating pressures in excess of 1000 pounds per square inch are common. Obviously, the problem of providing adequate fluid seals for valves used in such high pressure aircraft systems is substantial, and, so far as I am aware, has not heretofore been solved in the art.

It is therefore one object of my invention to provide a rotary valve of the porting plate type which is adapted for operation in relatively high pressure fluid systems.

Another object of the invention is to provide a sealing means adapted to be used in such a rotary valve to provide a positive fluid-tight seal between two relatively moving surfaces. I prefer to accomplish this by providing a tubular sleeve adapted to engage the rotary porting plate and to be held in such engagement by hydraulic or spring pressure, or both, the manner of accomplishing this also being novel.

Still another object of the invention is to provide a sealing means adapted to be used in such a rotary valve to provide a positive fluid-tight seal between two relatively moving surfaces, including a tubular seal held in floating relationship against such surfaces.

It is another object of my invention to provide such a sealing means as is generally described above, in which means is provided for automatically bleeding off any excess and undesired pressure fluid that may accumulate behind the sealing means as a result of minor leakage between parts of the valve.

A further object of the invention is to provide such a sealing means which automatically compensates for wear, misalignment, and expansion of mating sealing surfaces, I prefer to utilize metal-to-metal for the primary sealing surfaces of my invention, although this is not essential under certain conditions of operation or use.

Still another object of the invention is to provide fluid seal particularly adapted for use in a valve of the rotary porting plate type and one which is economical to manufacture, simple to assemble, and in which replacements of parts is greatly expedited and facilitated. Consequently, the specific construction of the preferred embodiment disclosed has a number of design features that contribute materially to the success of my invention, as will become apparent hereinafter.

Other objects and advantages will appear from the specification and drawing, which are for the purpose of illustration only, and in which:

Fig. 1 is an end view of a valve device incorporating my improved fluid seals.

Fig. 2 is a cross-sectional view taken on the line 2—2 of Fig. 1.

Fig. 3 is a sectional view taken on the line 3—3 of Fig. 2, partly broken away to illustrate better the internal construction of the valve device.

Fig. 4 is an enlarged fragmentary sectional view of the preferred sealing means of the invention.

Fig. 5 is an enlarged fragmentary sectional view of an alternative form of sealing means of my invention.

Referring to the drawing, I prefer to show my improved sealing means as applied to use in a valve of the type disclosed in my application, referred to previously. Such a valve comprises a housing 10 preferably, although not necessarily, circular in form, provided at one end with an annular flange 11 and an axial bore 12, the latter forming a valve chamber in the housing and providing a flat chamber wall 13 which is perpendicular to the longitudinal axis of the housing.

Disposed within the axial bore 12 is a rotatable plate member 14 having an actuating rod 15 connected thereto or formed integrally therewith and extending axially from the housing 10, the actuating rod 15 being provided with a hub 17 which is journalled in a bearing opening 18 centrally formed in a cover plate member 19 which, in turn, is suitably secured, as by machine screws 20, to the annular flange 11 of the housing 10.

Annularly formed in the bearing opening 18 is a packing channel 21 in which suitable packing 22 is provided to engage the hub 17 and from a fluid seal therewith to prevent fluid leakage between the bearing opening and the hub. Provided on the outer end of the actuating rod 15, and rigidly secured thereto, is an operating handle 23 by which the actuating rod and the rotatable plate member 14 may be rotated. Disposed between the cover plate member 19 and the rotatable plate member 14 in the axial bore 12 is a thrust bearing 24, of conventional form, which, together with the bearing opening 18, forms means for rotatably supporting the plate member in the housing.

As best shown in Figs. 1 and 2, the housing 10 is provided with a first port 26, a second port 27, a third port 28, and a fourth port 29, the ports being preferably equisdistantly circumferentially spaced and having their axes parallel to the axis of the housing 10. As will be understood by those skilled in the art, more or less of such ports may be provided and they may be differently spaced, without departing from the spirit of my invention. Since the ports 26, 27, 28, and 29 are all identical in construction, only one thereof will be described in detail, and since each of the ports contains an improved sealing means 30, all of which are of identical construction, only one of such sealing means will be described in detail.

The port 27 is provided at its outer end with threads 32 adapted to threadedly receive suitable piping (not shown), the inner end of the port being counterbored to provide a cylindrical bore 33 of enlarged diameter and forming an annular shoulder 34. This construction is best illustrated in Fig. 4, which is also referred to for the specific construction of the sealing means 30.

The sealing means 30 includes a tubular sleeve 35 provided on its inner end with an annular shoulder 36, the sleeve 35 and annular shoulder 36 being of smaller external diameter than the port 27 and the cylindrical bore 33, respectively, whereby to adapt the sealing means 30 to tilt therein to adjust the inner face of its shoulder 36 with and to engage a facing plate 37 to be described hereinafter. The outer end face 39 of the annular shoulder 36 is undercut on a radius indicated by the dotted line 40. The annular shroulder 36 is provided with an inner annular groove 41 and an outer annular groove 42 to form an engaging face 43 therebetween which engages the facing plate 37. I have found it desirable to make the engaging face 43 of relatively small cross-sectional area so as to reduce friction between the engaging face and the facing plate 37, and I have further found that by reducing the area of engagement of the engaging face 43 more perfect sealing is provided against the facing plate 37, the engaging face tending to wear quickly to form a substantially perfect fluid seal against the facing plate. This action is particularly true when both the shoulder 36 and the facing plate 37 are formed of metal as I intend them to be in the preferred form of the invention. The inner annular groove 41 has a further function in that it permits fluid from the interior of the tubular sleeve 35 to exert a longitudinal pressure outwardly against the inner end of the sleeve to at least partially balance fluid pressure exerted by such fluid on the opposite end of the sleeve, which reduces the tendency of the sleeve to lock against the facing plate 37 in response to hydraulic pressure bearing on the outer end of the sleeve. The external diameter of the inner annular groove 41 may, of course, be varied as desired and must be correlated with the maximum fluid pressure admitted to the sleeve 35 and the cross-sectional area of the outer end of the sleeve. The outer annular groove 42 also has an additional function in increasing the available end area of the shoulder 36 radially outward from the engaging face 43 so that in the event pressure fluid leaks into the annular space between the shoulder and the cylindrical bore 33, this pressure fluid will exert a hydraulic thrust against the inner end of the shoulder and consequently the tubular sleeve 35 so that in the event the pressure thereof builds up to a sufficiently large figure relative to the fluid pressure within the tubular sleeve 35, it will exert an outward thrust on the tubular sleeve tending to force it out of engagement with the facing plate 37 to permit this excess pressure on its exterior to bleed off directly into the interior of the tubular sleeve and thus be released from the device.

Disposed on and encircling the tubular sleeve 35 is an annular packing element 45, preferably formed of neoprene or other resilient material. The packing element 45 is provided with an inner convex end face 46, formed to substantially the radius indicated by the dotted line 40, and which engages and mates with the undercut end face 39 of the shoulder 36. The packing element 45 is also provided with a bevelled external face 47 and with an outer vertical end face 48 against which engages a follower washer 49, which in turn is engaged by a compression spring 50, the other end of which engages the annular shoulder 34. When assembled as shown in Fig. 4, the compression spring 50 exerts a longitudinal thrust against the washer 49 and in turn against the sleeve 35 through the packing element 45 and the shoulder 36 to tend to maintain the engaging face 43 in pressure engagement with the facing plate 37 so as to provide a fluid seal therebetween. As has been explained, the external diameter of the tubular sleeve 35 is somewhat less than the diameter of the port 27, and consequently fluid can readily flow therebetween into the cylindrical bore 33 to exert a fluid pressure against the washer 49 as well as against the outer end of the tubular sleeve 35 which, because the area thereof is greater than the area on the inner end of the sleeve 35 to which such fluid pressure is admitted, provided a differential area piston arrangement by which the fluid pressure also tends to exert a thrust leftward, as seen in Fig. 4, against the tubular sleeve 35 to maintain the engaging face 43 in pressure engagement with the facing plate 37. Thus, while the compression spring 50 may not be absolutely essential in some installations and may be dispensed with if desired, I prefer to include it so as to provide a positive mechanical means for holding the engaging face 43 in sealing engagement with the facing plate 37 to insure reengagement in the event that fluid pressure in the outer annular groove 42 forces the tubular sleeve 35 to the right, as seen in Fig. 4, to enable excess pressure in the outer annular groove to bleed back into the interior of the tubular sleeve.

Provided between the end face 39 of the annular shoulder 36 and the bevelled external face 47 of the packing element 45 is a wedge ring 52 of generally triangular shape, having an outer cylindrical surface 53 in sliding engagement with the cylindrical bore 33, an inner bevelled face 54 engaging the bevelled external face 47 of the packing element 45, and having an end face 55 formed on the radius indicated by the dotted line 40 and which mates with the outer portion of the undercut end face 39 of the shoulder 36. The specific form of the wedge ring 52 is an important feature of the invention, as it prevents the packing element 45 and the material thereof from creeping or extruding into the space between the periphery of the annular shoulder 36 and the cylindrical bore 33. The wedge ring 52 is preferably formed of metal, such as, for example, brass or bronze, although any suitable material may be used.

Due to the fact that the end face 39 of the annular shoulder 36 is undercut on the radius indicated by the dotted line 40 and the end faces 46 and 55 of the packing element 45 and the wedge ring 52, respectively, mate therewith, it forms what is, in effect, a ball and socket joint between the tubular sleeve 35 and the packing element 45 and wedge ring 52, thus permitting slight oscillatory movement therebetween to permit the engaging face 43 of the tubular sleeve 35 to properly align itself in fluid-tight engagement with the facing plate 37. The tubular sleeve 35 may thus be regarded as being retained in floating relationship relative to the facing plate 37 to permit automatic self-alignment therebetween and to compensate for wear therebetween.

As best shown in Figs. 2 and 3, the rotatable plate member 14 is provided with a first arcuate passage 57 and a second arcuate passage 58, which, as will be noted, are of relatively large cross-sectional area so as to permit a free and uninterrupted flow of fluid therethrough and thus prevent any substantial pressure drop therethrough. Both the plate member 14 and the housing 10 may be centrally cored out to form chambers 59 and 60, respectively, to lighten the weight of the unit, although these chambers, or either of them, may be omitted if desired, as they have no mechanical function in the valve. Secured to the inner face of the plate member 14, as by suitable screws 61, is the facing plate 37. The facing plate 37 is provided with apertures 63, 64, 65, and 66, which are, in the embodiment shown, spaced therein similarly to the spacing of the ports 26, 27, 28, and 29, the apertures 63 and 64 communicating with the first arcuate passage 57 of the plate member 14, and the apertures 65 and 66 communicating with the second arcuate passage 58 of the plate member.

As will be understood by those skilled in the art, the construction shown is simple to manufacture and easy to assemble or disassemble. Removal of the machine screws 20 permits the cover plate member 19, the thrust bearing 24, and the rotatable plate member 14 with the facing plate 37 attached thereto to be withdrawn from the housing 10 as a unit, following which each of the sealing means 30 may be readily removed from the housing 10 through the axial bore 12 of the housing. Consequently, any of the parts of the device may be easily removed for replacement or repair, and upon assembly or reassembly each of the sealing means 30 will automatically align itself properly with the facing plate 37 so that such assembly or reassembly may be carried out by an unskilled operator.

In operation, as will be understood by those skilled in the art, the first port 26 may be connected by suitable tubing (not shown) to a source of fluid under pressure, the second port 27 may similarly be connected to a point of disposal, and the ports 28 and 29 may be similarly connected to points of usage of the fluid, in which case the port 26 may be termed an inlet port, the port 27 an outlet port, and the ports 28 and 29 may be termed supply ports. Such fluid connections are standard practice in aircraft where a four-way valve is utilized to alternatively direct flow from a source of high pressure fluid to either end of an actuating cylinder having a piston therein, in which when the inlet is in communication with one end of the cylinder the outlet is in communication with the other, and vice versa. Valves for this purpose in aircraft operation are commonly referred to as "selector valves," and my valve device described herein may be used in such a manner. When so used, as will be understood, when the parts of my valve device are in the positions illustrated in the drawing, the port 26 communicates through the aperture 63 and the first arcuate passage 57 and the aperture 64 with the port 28, and the port 27 communicates through the aperture 65 and the second arcuate passage 58 and the aperture 66 with the port 29. By rotating the plate member 14 ninety degrees clockwise, as illustrated by the arrow 67 in Fig. 3, fluid communication is opened from the port 26 through the aperture 64 and the first arcuate passage 57 and the aperture 63 with the port 29, and simultaneously fluid communication is provided between the port 27 and the port 28 through the aperture 66 and the second arcuate passage 58 and the aperture 65. Thus, in the embodiment disclosed, there are two operating positions of the valve, but it is to be noted that the plate member 14 may be rotated to an intermediate position in which the apertures 63, 64, 65, and 66 are out of alignment with the ports 26, 27, 28, and 29 so that no fluid may flow through the arcuate passages 57 and 58, and this intermediate position may be termed a neutral position.

An alternative form of sealing means 70 is illustrated in Fig. 5, which may be substituted for the sealing means 30 in the preferred embodiment if the valve device is desired to be used to control a flow of fluid at low pressures. It is to be noted that the sealing means 70 is directly interchangeable with the sealing means 30, which is a feature of the invention adapting it to either high or lower pressure use as desired, although it is to be understood that the preferred embodiment illustrated in Figs. 1 to 4, inclusive, may also be used to control the flow of fluid at low pressures without change if desired. The sealing means 70 includes a sealing ring 71 similar in purpose to the tubular sleeve 35 of the embodiment previously described, the sealing ring 71 being provided with an engaging face 72 similar to the engaging face 43 in general purpose and which is adapted to engage the facing plate 37 of the plate member 14. The sealing ring 71 is provided with a peripheral convex face 73 formed on a radius indicated by the dotted line 74, which permits the sealing ring to automatically align itself with the facing plate 37 in assembly or due to wear between these parts. The sealing ring 71 is provided with an undercut groove 75 in its inner face, which is provided for the same general purpose as the outer annular groove 42 illustrated in Fig. 4. The sealing ring 71 is provided with an outer face 77 to which is suitably secured one end of a Sylphon bellows 78, which may be formed of metal or resilient material, such as, for example, rubber or neoprene, the other end of the bellows being secured to a washer ring 79 preferably formed of neoprene or rubber and which in turn engages the shoulder 34 of the housing 10. As will be understood, in this form of sealing means fluid pressure in the port 27 is, in effect, admitted to substantially the entire outer face 77 of the sealing ring 71 by the bellows 78, and since the cross-sectional area of the outer face 77 is substantially greater than the cross-sectional area of the engaging face 72, the fluid pressure exerts a longitudinal thrust on the sealing ring tending to retain it in sealing engagement with the facing plate 37. A compression spring 76, similar in function to the compression spring 50, is provided in this embodiment, although, if desired, the spring 76 may be omitted in some installations.

Although I have shown and described preferred embodiments of my invention, it is to be understood that departure may be made from the specific disclosure without departing from the spirit of my invention, accordingly I do not intend to be limited thereby, but desire to be afforded the full protection of the following claims.

I claim as my invention:

1. Means for forming a fluid seal between a cylindrical bore of a pressure fluid passage in a housing and a plate member disposed against one end of said housing, said member being movable in a plane normal to the axis of said bore and having an aperture adapted to register with said passage, including: a sealing member adapted to fit loosely into said bore so as to be axially movable and tiltable therein, one end of said sealing member having an inner and an outer annular groove providing an annular engaging face therebetween, said annular face being of larger diameter than said aperture; and means for sliding said sealing member toward said plate member to maintain said annular engaging face in pressure engagement with said plate member.

2. Means for forming a fluid seal between a cylindrical bore of a pressure fluid passage and a plate member partially closing one end of said passage, including: a tubular sleeve adapted to fit loosely into said cylindrical bore so as to be axially movable therein, one end of said sleeve being adapted to engage said plate member; an annular packing element around said sleeve and supported entirely thereby, said element having a peripheral face of less width than that of its internal face and adapted to engage said cylindrical bore to form a fluid seal between said sleeve and said bore; and means for holding said sleeve in pressure engagement with said plate member.

3. Means for forming a fluid seal between a cylindrical bore of a pressure fluid passage and a plate member partially closing one end of said passage, including: a tubular sleeve adapted to fit loosely into said cylindrical bore so as to be axially movable therein, one end of said sleeve being adapted to engage said plate member, the other end of said sleeve being exposed to fluid pressure in said bore tending to hold said sleeve in pressure engagement with said plate member; and an annular packing element of irregular cross-sectional shape around said sleeve and supported entirely thereby, said element having a peripheral face of less width than that of its internal face and adapted to engage said cylindrical bore to form a fluid seal between said sleeve and said bore.

4. Means for forming a fluid seal between a cylindrical bore of a pressure fluid passage and a plate member partially closing one end of said passage, including: a tubular sleeve adapted to fit loosely into said cylindrical bore so as to be axially movable therein, one end of said sleeve being adapted to engage said plate member, the other end of said sleeve being exposed to fluid pressure in said bore tending to hold said sleeve in pressure engagement with said plate member; an annular packing element of irregular cross-sectional shape around said sleeve and supported entirely thereby, said element having a peripheral face of less width than that of its internal face and adapted to engage said cylindrical bore to form a fluid seal between said sleeve and said bore; and spring means for yieldably holding said sleeve in pressure engagement with said plate member.

5. Means for forming a fluid seal between a cylindrical bore of a pressure fluid passage and a plate member partially closing one end of said passage, including: a tubular sleeve adapted to fit loosely into said cylindrical bore so as to be axially movable therein, said sleeve having an annular shoulder adjacent one end of said sleeve, said one end being adapted to engage said plate member, one side of said shoulder disposed remote from said one end being undercut on a radius; an annular packing element around said sleeve and having a convex end disposed within said undercut portion of said shoulder, said packing element being adapted to also engage said cylindrical bore to form a fluid seal between said sleeve and said bore; and means for holding said sleeve in pressure engagement with said plate member.

6. Means for forming a fluid seal between a cylindrical bore of a pressure fluid passage and a plate member partially closing one end of said passage, including: a tubular sleeve adapted to fit loosely into said cylindrical bore so as to be axially movable therein, said sleeve having an annular shoulder adjacent one end of said sleeve, said one end being adapted to engage said plate member, one side of said shoulder being undercut on a radius; an annular packing element around said sleeve and having a convex end adapted to engage said undercut portion of said shoulder, said packing element being adapted to engage said cylindrical bore to form a fluid seal between said sleeve and said bore; an annular, substantially triangular wedge ring, one face of which engages said bore, a second face of which engages said packing element, and a third face of which engages said undercut portion of said shoulder between said shoulder and said packing element; and means for holding said sleeve in pressure engagement with said plate member.

JAMES W. F. HOLL.

REFERENCES CITED

The following references are of record in the file of this patent:

UNITED STATES PATENTS

| Number | Name | Date |
|---|---|---|
| 1,027,178 | Caskey | May 21, 1912 |
| 2,030,458 | McKellar | Feb. 11, 1936 |
| 2,317,407 | Samiran | Apr. 27, 1943 |
| 2,365,046 | Bottomley | Dec. 12, 1944 |
| 2,375,633 | Downey | May 8, 1945 |
| 2,392,198 | Snyder | Jan. 1, 1946 |
| 2,419,588 | Pasco | Apr. 29, 1947 |

FOREIGN PATENTS

| Number | Country | Date |
|---|---|---|
| 349,531 | Italy | June 16, 1937 |